United States Patent Office 3,397,747
Patented Aug. 20, 1968

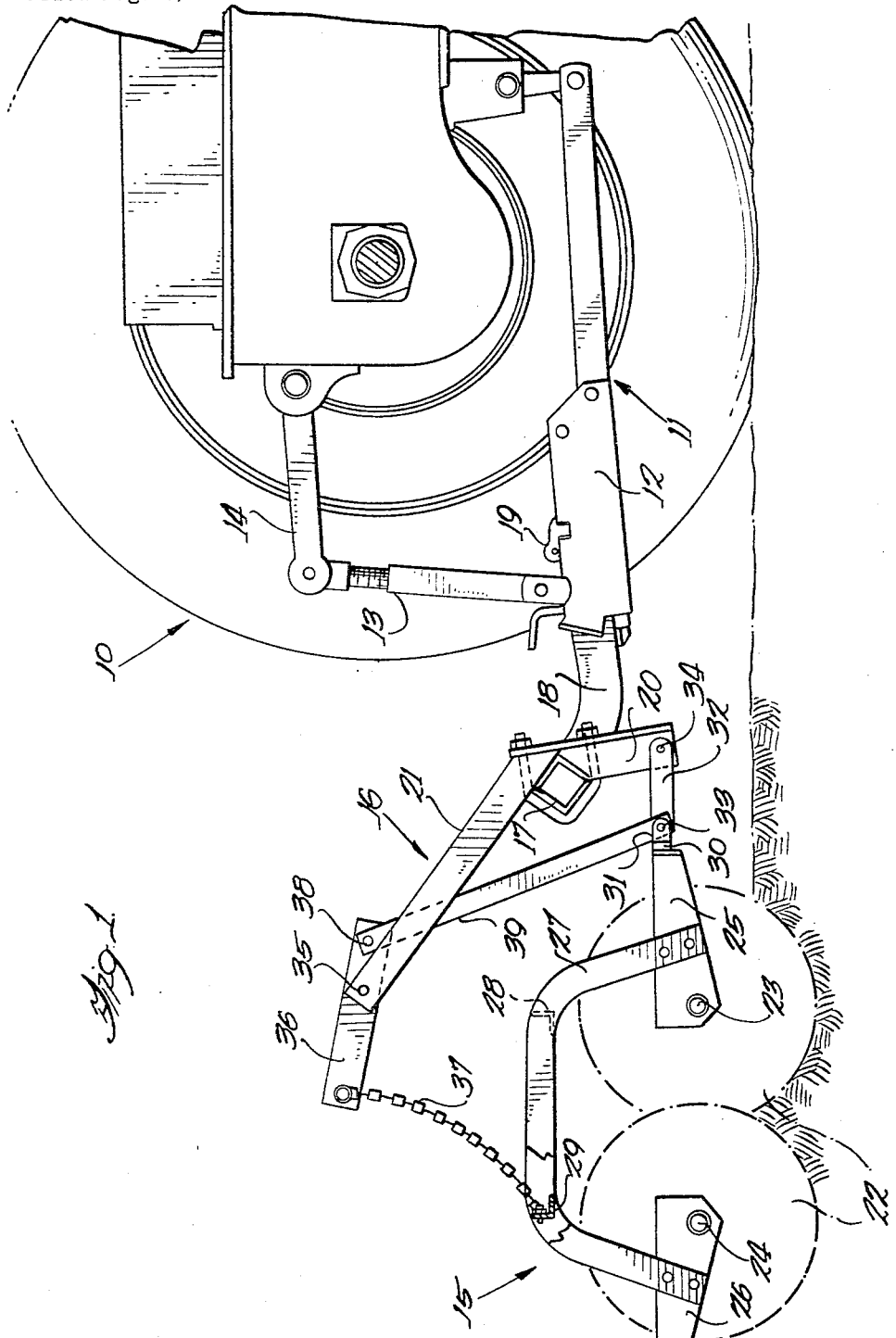

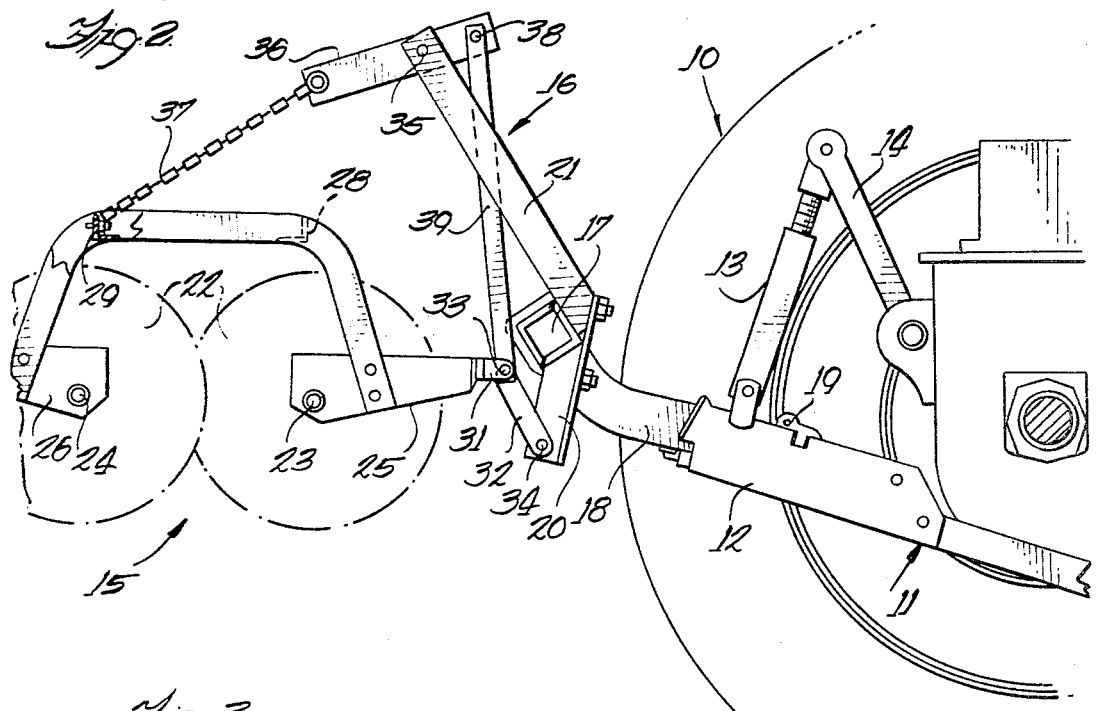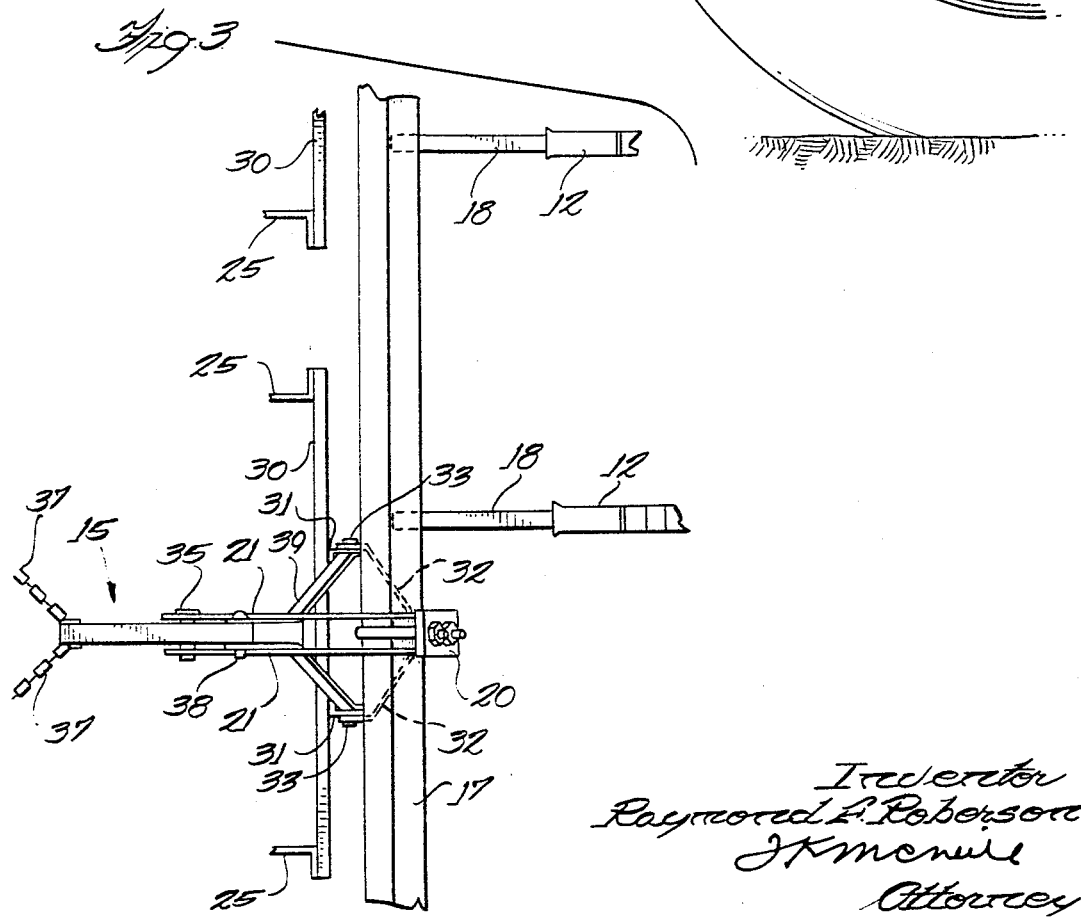

3,397,747
DIRECT CONNECTED IMPLEMENT CARRIER
Raymond F. Roberson, Plainfield, Ill., assignor to International Harvester Company, Chicago, Ill., a corporation of Delaware
Filed Aug. 6, 1965, Ser. No. 477,823
6 Claims. (Cl. 172—467)

This invention relates to agricultural implements and particularly to tractor-mounted implements. More specifically, the invention concerns a novel implement carrier.

Implements such as harrows, rotary hoes and the like are usually loosely connected to the tractor by draft links which swing downwardly when the implement is to be raised for transport, reducing the transport clearance of the implement.

An object of the present invention is to provide a carrier for an implement of the type referred to for connection to a tractor, wherein the implement is raised sufficiently above the ground to provide the desired transport clearance front and rear.

Another object of the invention is to provide in an implement of the type referred to, wherein a loose link connection between the implement and the tractor accommodates vertical floating movement of the implement in operation, means in the connection of the implement to the tractor to offset the tendency of the loose link to sag when the implement is lifted, whereby transport clearance of the implement is improved.

Other objects and advantages of the invention will become clear from the following detailed description when read in conjunction with the accompanying drawings wherein:

FIGURE 1 is a view in side elevation, partly in section, showing the rear end of a tractor having connected thereto an implement and carrier incorporating the features of this invention;

FIGURE 2 is a view similar to FIGURE 1 showing the implement in a transport position; and FIGURE 3 is a plan view, on a larger scale, of a portion of the structure shown in FIGURE 1.

In the drawings, the numeral 10 designates a tractor having a drawbar 11 including laterally spaced socket members 12 each of which is connected by a lift link 13 to an arm 14 pivotally mounted on the tractor, said arms 14 being swingable about their pivot axes from a lowered position corresponding to the operating position of an implement as shown in FIGURE 1, to a raised or non-operating position as shown in FIGURE 2, power-operated means, not shown, being provided on the tractor for rocking the arms 14.

An implement 15 is connected to the tractor through the intermediary of carrier mechanism 16 including a transversely extending tool bar 17 to which are affixed laterally spaced forwardly projecting hitch members 18 adapted to be slidably received in the socket members 12 and releasably held therein by latch means 19.

Although the present invention is applicable to other earth-working apparatus, the present invention is described in its application to a field cultivator such as a rotary hoe, designated by the numeral 15, and comprises rotary ground-engaging devices 22 mounted on front and rear shafts 23 and 24 carried by plates 25 and 26, connected by an arched frame member 27, plates 25 and 26 being arranged in pairs at opposite ends of shafts 23 and 24, an arched bar 27 being provided at each end of the shafts 23 and 24 and connected by transversely extending angle bars 28 and 29, these implement parts being shown only in FIGURES 1 and 2.

As indicated in FIGURE 3, tool bar 17 is transversely elongated and is adapted for the mounting thereon of a plurality of cultivator units 15. The laterally spaced plates 25 of each implement unit 15 are bent laterally at their forward ends and secured to a transversely extending bar 30 to which are affixed forwardly projecting lugs 31 to which a pair of forwardly converging links 32 are pivotally connected by pins 33. The forward ends of links 32 are pivotally connected at 34 to the lower end of bracket 20, whereby the links 32 are capable of vertical swinging between the positions shown in FIGURES 1 and 2.

The upper end of upright or standard 21 carries a pivot pin 35 which serves as the fulcrum for a lever 36 medially of its ends, the rear portion of lever 36 constituting a lever arm connected at its end by downwardly and rearwardly diverging chains 37 to the transverse frame bar 29 of the implement section 15.

The forwardly projecting portion of lever 36 is connected at its end by a pivot pin 38 to the upper end of a lift member in the form of a pair of links 39 diverging at their lower ends and pivotally mounted upon pins 33.

As will be observed in the drawings, chain 37 is slack in the operating position of the implement shown in FIGURE 1, allowing the implement to float in a vertical plane relative to the tool bar 17. When the implement is raised to the transport position of FIGURE 2, it maintains substantially the parallel relationship thereof with respect to the ground, chain 37 becoming taut and rocking lever 36 in a counterclockwise direction, lifting the member 39 and swinging links 32 upwardly about their pivots 34 on bracket 20.

It is believed that the construction and operation of the novel implement and carrier construction of this invention will be clearly understood from the foregoing description. It should likewise be understood that the invention has been described in its preferred embodiment and that modifications may be made thereof without departing from the spirit of the invention or the scope of the appended claims.

What is claimed is:

1. Apparatus for connecting an implement to a tractor having a drawbar pivotally connected to the tractor and power lift means connected to the drawbar to vertically swing the latter about its pivotal connection to the tractor between positions corresponding to operating and transport positions of the implement comprising, means forming a floating connection between the forward portion of the implement and the drawbar to accommodate vertical movement of said front end of the implement relative to the drawbar, said drawbar including a member extending upwardly therefrom, a rockable member pivotally mounted on said upwardly extending member and having a lifting connection to the rear portion of the implement, and another lifting connection between said rockable member and the forward portion of the implement to raise the latter relative to the drawbar upon raising the drawbar about its pivotal connection to the tractor.

2. The invention set forth in claim 1, wherein said rockable member is a lever pivoted medially of its ends on said upwardly extending member for rocking about a transverse axis, the rear end of said lever being connected to the rear portion of the implement and the forward end of the lever to the forward portion of the implement.

3. The invention set forth in claim 2, wherein said floating connection of the implement to the drawbar includes link means pivotally connected at one end to the forward end of the implement and at its other end to the drawbar for vertical movement of the link means about its pivotal connection to the drawbar.

4. The invention set forth in claim 3, wherein the connection between said lever and the rear portion of the implement is flexible and the connection between the forward end of the lever and the implement is relatively rigid.

5. Apparatus for connecting an implement to a tractor to be transported thereby comprising, drawbar means mounted on the tractor, power lift means carried by the tractor connected to said drawbar means for vertically moving the latter between operating and transport positions, longitudinally extending link means pivotally connected at its forward end to the drawbar and at its rear end to the implement and vertically swingable about its pivotal connection to the drawbar to accommodate vertical movement of the implement relative to the drawbar, means serving as a boom carried by the drawbar and extending upwardly therefrom to a location above said implement, a lever having a fulcrum medially of its ends on said boom and having arms extending forwardly and rearwardly from said fulcrum, flexible means connecting said rearwardly extending arm to the implement near its rear end, and a lift member pivotally connected at one end to said forwardly extending arm and at its other end to the forward end of the implement, the weight of the implement, upon raising said drawbar means rocking said lever in a direction to vertically swing the front end of the implement about the pivotal connection of said link to the drawbar.

6. The invention set forth in claim 5, wherein stop means is mounted on said link means and engageable with said drawbar means to limit the upward swinging of the link means when the implement is raised to its transport position.

References Cited
UNITED STATES PATENTS 2,775,176   12/1956   Gibson _____ 172—502 X
2,790,364   4/1957   Bunting _____ 172—465 X

FOREIGN PATENTS 1,311,339   10/1961   France.

ABRAHAM G. STONE, *Primary Examiner.*

R. C. HARRINGTON, *Assistant Examiner.*